Patented Feb. 14, 1933

1,897,881

UNITED STATES PATENT OFFICE

LUCIEN PAUL BASSET, OF PARIS, FRANCE

PROCESS FOR THE SIMULTANEOUS MANUFACTURE OF IRON OR ITS CARBIDE COMPOUNDS AND OF PORTLAND CEMENT OR HYDRAULIC LIMES

No Drawing. Application filed September 29, 1930, Serial No. 485,326, and in France September 28, 1929.

The invention resides in a process for the simultaneous production of iron or its carbide compounds and of Portland cements or hydraulic limes.

It is known that blast furnace slags are basic silicates of alumina and lime, in which the lime appears to be in a state of solid solution. It is also known that these slags, if suddenly cooled and pulverized, may give genuine cements by being mixed with a suitable proportion of hydrate of lime.

Starting from these known facts the applicant proposes to produce in a systematic manner, by the rational treatment of iron ores, both iron and cement of the Portland type.

It will be remembered that these cements consist of a mixture of tricalcium silicate and tricalcium aluminate with a small proportion of iron oxide.

In the course of the usual metallurgical treatments these elements are quantitatively present in the mixing bed; silica and alumina already exist in the gangue of the ore and are also found in the ashes of the coal; the lime is added as a flux if the gangue does not contain sufficient.

In Portland cements, however, the ratio between CaO on the one hand and the mixture ($SiO_2$, $Al_2O_3$, $Fe_2O_3$) is of great importance. This ratio necessarily remains between very close limits, which correspond to from 60–70% of lime.

In the second place the formation of the Portland cement is incompatible with the fusion of these constituent elements, and the cement can only be obtained by the combination of very finely divided elements, only requiring, therefore, at most, the temperature of vitrification, in order to effect the combination.

According to what is stated above, the conditions that ought to be satisfied on the one hand by metallurgical technology and on the other hand by the technology of the manufacture of Portland cement are not antagonistic. They even comprise common elements, if, amongst the technical processes for the production of iron or its carbides, the methods of production in the rotating hearth are more especially considered, in which there is utilized as the heating agent a flame obtained by the combustion of coal pulverized to the appropriate degree and burning in proportions of air that are suitable for obtaining the percentage of carbon monoxide which is necessary and sufficient to prevent the reoxidation of the ferrous product.

It will be recollected that in these methods of production, which have formed the subject of prior patents of the present applicant, particularly No. 1,435,686, dated November 14, 1922, the ore, the reducing carbon and the lime are intimately mixed before being introduced into the kiln, the latter being heated by a flame having the above mentioned properties.

The present invention consists in preserving the essential characteristics of the metallurgical treatment, while at the same time satisfying the conditions required by the technology of cement manufacture.

In principle it may be characterized as follows:—

(1) The slag is given the lime content necessary for satisfying the chemical analysis of Portland cement;

(2) The constituents of this cement are put in a form appropriate to the formation of the combination constituting the cement, by crushing to a state of exceedingly fine powder, incomparably finer than that which would be required by metallurgical technology taken alone.

In practice the process will be put in operation in a rotary kiln inclined on its axis and charged in a continuous manner with a mixture of iron ore and of the quantity of carbon necessary and sufficient for effecting the reduction of this ore and if desired the carburation of the metal. To this mixture lime is added in the proportions that correspond not to the usual slag with from 40–50% of lime but to a slag containing from 60–70%, this proportion admitting of being raised even to 75 or 80% if it is desired to produce hydraulic lime.

If the gangue of a single ore does not give directly a suitable ratio of silica and alumina this would be obtained by mixing several ores, or, failing this, by adding silica or alumina.

The mixture is subjected to a grinding incomparably finer than in the case of the application of the metallurgical process alone.

It must therefore be clearly understood that the metallurgical ingredients are crushed to a state of extreme fineness, not for the purpose of complying with a necessity of a metallurgical nature but for the purpose of satisfying a condition of the manufacture of Portland cement namely the formation of a solid solution.

The rotary kiln in which this mixture, preferably crushed in water, travels along, as practiced in the cement industry, is heated by a flame produced by a fuel, preferably lean, reduced to a state of flour, burning in the proportion of air suitable for obtaining the percentage of CO necessary and sufficient to prevent the reoxidation of the ferrous product finally obtained.

The coal for heating will preferably be brought into a state of division which will render it possible to obtain, by its time of combustion, on the front of the hearth, a zone of combustion in carbon dioxide, and, upon the remainder of the length of the hearth, a zone of carbon monoxide.

An important consequence of the formation of Portland cement in the course of the thermo chemical treatment of the ore resides in the fact that the slag is practically suppressed, in the sense that it ceases to be fusible. It will in fact be found that the metal is finally collected in a state of occlusion in the grains of cement. The product has the appearance of small concretions rather similar to the clinkers or calcined products that are collected in the current manufacture of cements. In other words the metal is found in a liquid state in the cement conglomerate.

The non-fusion of the slag renders possible the utilization of a wide variety of linings, since the deterioration of the latter is considerably reduced. The economy is considerable.

The product is crushed, and the iron or cast iron is separated in a magnetic separator.

The metal is then remelted, either in an electric furnace or as an addition on the hearth of a Martin's furnace, or else in a state of purity in a furnace, rotary or otherwise, with its axis inclined or horizontal, preferably heated by a flame of pulverized coal burning in the quantity of air necessary for obtaining a flame rich in carbon monoxide, which will prevent the reoxidation of the metal in the course of its fusion.

It is important to observe that the slag, although not melted, continues to fulfil its function; the silicate of iron not reducible by the carbon monoxide is converted into silicate of lime by the metallurgical lime, the iron oxide thus being liberated. The lime therefore plays its metallurgical part, but, in addition, it intervenes as a constituent element of the cement, as a finished product. The gangue serves also as a raw material for the cement and is therefore utilized, thanks to the interpenetration of the two technologies of metallurgy of iron and of Portland cement. The sulphur of the mixture is entirely eliminated from the metal produced.

The present process is applicable to all metals having properties similar to iron.

I claim:—

1. A process for the simultaneous production of iron and of Portland cements and hydraulic limes which comprises charging a kiln in the presence of alumina with a mixture of iron ore and the quantity of carbon necessary and sufficient for effecting the reduction of this ore, adding to this mixture in the kiln lime in the proportions that correspond to a slag satisfying the chemical analysis of Portland cement, said constituents having been previously crushed to a state of exceedingly fine powder, heating the mixture without fusing the slag by a flame produced by a fuel burning in the proportion of air suitable for obtaining the percentage of carbon monoxide necessary and sufficient to prevent the reoxidation of the ferrous product finally obtained.

2. A process for the simultaneous production of iron and of Portland cements and hydraulic limes which comprises charging a kiln in the presence of alumina with a mixture of iron ore and the quantity of carbon necessary and sufficient for effecting the reduction of this ore, adding to this mixture in the kiln lime in the proportions that correspond to a slag containing 60–80% of lime, these constituents having been previously crushed to a state of exceedingly fine powder, heating the mixture without fusing the slag by a flame produced by a fuel burning in the proportion of air suitable for obtaining the percentage of carbon monoxide necessary and sufficient to prevent the reoxidation of the ferrous product finally obtained.

3. A process for the simultaneous production of iron and of Portland cements and hydraulic limes which comprises charging a kiln in the presence of alumina with a mixture of iron ore and the quantity of carbon necessary and sufficient for effecting the reduction of this ore and the carburation of the metal, adding to this mixture in the kiln lime in the proportions that correspond to a slag satisfying the chemical analysis of Portland cement, these constituents having been previously crushed to a state of exceedingly fine powder, heating the mixture without fusing the slag by a flame produced by a fuel burning in the proportion of air suitable for obtaining the percentage of carbon monoxide necessary and sufficient to prevent the reoxidation of the ferrous product finally obtained.

4. A process for the simultaneous production of iron and of Portland cements and hydraulic limes which comprises charging a rotary kiln in the presence of alumina with a mixture of iron ore and the quantity of carbon necessary and sufficient for effecting the reduction of this ore, adding to this mixture in the kiln lime in the proportions that correspond to a slag satisfying the chemical analysis of Portland cement, these constituents having been previously crushed to a state of exceedingly fine powder, heating the mixture without fusing the slag by a flame produced by a carbon brought into a state of division which will render it possible to obtain in time of combustion, on the front of the hearth, a zone of combustion of carbon dioxide and, upon the remainder of the length of the hearth, a zone of carbon monoxide.

5. A process for the simultaneous production of iron and of Portland cements and hydraulic limes which comprises charging a kiln in the presence of alumina with a mixture of several iron ores and the quantity of carbon necessary and sufficient for effecting the reduction of this ore, adding to this mixture in the kiln lime in the proportions that correspond to a slag satisfying the chemical analysis of Portland cement, said constituents having been previously crushed to a state of exceedingly fine powder, heating the mixture without fusing the slag by a flame produced by a fuel burning in the proportion of air suitable for obtaining the percentage of carbon monoxide necessary and sufficient to prevent the reoxidation of the ferrous product finally obtained.

6. A process for the simultaneous production of iron and of Portland cements and hydraulic limes which comprises charging a kiln in the presence of alumina with a mixture of iron ores added with silica, and the quantity of carbon necessary and sufficient for effecting the reduction of this ore, adding to this mixture in the kiln lime in the proportions that correspond to a slag satisfying the chemical analysis of Portland cement, these constituents having been previously crushed to a state of exceedingly fine powder, heating the mixture without fusing the slag by a flame produced by a fuel burning in the proportion of air suitable for obtaining the percentage of carbon monoxide necessary and sufficient to prevent the reoxidation of the ferrous product finally obtained.

7. A process for the simultaneous production of iron and of Portland cements and hydraulic limes which comprises charging a kiln in the presence of alumina with a mixture of iron ores with alumina added, and the quantity of carbon necessary and sufficient for effecting the reduction of these ores, adding to this mixture in the kiln lime in the proportions that correspond to a slag satisfying the chemical analysis of Portland cement, these constituents being crushed to a state of exceedingly fine powder, heating the mixture without fusing the slag by a flame produced by a fuel burning in the proportion of air suitable for obtaining the percentage of carbon monoxide necessary and sufficient to prevent the reoxidation of the ferrous product finally obtained.

8. A process for the simultaneous production of iron and of Portland cements and hydraulic limes which comprises charging a kiln in the presence of alumina with a mixture of iron ores with silica and alumina added, and the quantity of carbon necessary and sufficient for effecting the reduction of these ores, adding to this mixture in the kiln lime in the proportions that correspond to a slag satisfying the chemical analysis of Portland cement, these constituents being crushed to a state of exceedingly fine powder, heating the mixture without fusing the slag by a flame produced by a fuel burning in the proportion of air suitable for obtaining the percentage of carbon monoxide necessary and sufficient to prevent the reoxidation of the ferrous product finally obtained.

9. A process for the simultaneous production of iron and Portland cement and hydraulic lime, consisting in mixing iron ore and the necessary and sufficient quantity of carbon for effecting the reduction of this ore, adding lime in such proportions that the resulting slag has the necessary calcareousness for satisfying the chemical analysis of the Portland cement, these various constituents having been previously crushed to a state of exceedingly fine powder, charging a furnace with the mixture thus obtained, heating this mixture without fusing the slag by a flame produced by a fuel burning in the proportion of air suitable for obtaining the percentage of carbon monoxide necessary and sufficient to prevent the reoxidation of the ferrous product finally obtained.

The foregoing specification of my "Process for the simultaneous manufacture of iron or its carbide compounds and of Portland cement or hydraulic limes," signed by me this 16th day of September 1930.

LUCIEN PAUL BASSET.